(12) United States Patent
Oh et al.

(10) Patent No.: US 10,319,965 B2
(45) Date of Patent: Jun. 11, 2019

(54) BATTERY CELL HOLDER MEMBER

(71) Applicant: SAMSUNG SDI CO., LTD., Yongin-si, Gyeonggi-do (KR)

(72) Inventors: Young Min Oh, Yongin-si (KR); No Hyun Kwag, Yongin-si (KR)

(73) Assignee: Samsung SDI Co., Ltd., Yongin-Si, Gyeonggi-do (KR)

(*) Notice: Subject to any disclaimer, the term of this patent is extended or adjusted under 35 U.S.C. 154(b) by 627 days.

(21) Appl. No.: 15/051,767

(22) Filed: Feb. 24, 2016

(65) Prior Publication Data

US 2017/0025654 A1    Jan. 26, 2017

(30) Foreign Application Priority Data

Jul. 20, 2015   (KR) .......................... 10-2015-0102677

(51) Int. Cl.
*H01M 2/10* (2006.01)
*H01M 2/20* (2006.01)

(52) U.S. Cl.
CPC ......... *H01M 2/1077* (2013.01); *H01M 2/105* (2013.01); *H01M 2/202* (2013.01)

(58) Field of Classification Search
None
See application file for complete search history.

(56) References Cited

U.S. PATENT DOCUMENTS

2009/0233163 A1   9/2009  Fang et al.
2011/0039142 A1*  2/2011  Kwag .................. H01M 2/105
                                                      429/99
2013/0118825 A1*  5/2013  Kwag .................... B62M 6/90
                                                      180/220
2013/0202934 A1   8/2013  Bae
2013/0316202 A1  11/2013  Bang et al.

FOREIGN PATENT DOCUMENTS

| CA | 2898561 A1 | 7/2014 | |
| CN | 104 393 210 A | 3/2015 | |
| DE | 10 2012 110644 A1 | 5/2014 | |
| JP | 06-080258 U | 11/1994 | |
| JP | 2008-34296 | * 2/2008 | ............. H01M 2/10 |
| KR | 10-2012-0012078 A | 2/2012 | |
| KR | 10-2012-0107371 A | 10/2012 | |
| KR | 10-2013-0090100 A | 8/2013 | |

OTHER PUBLICATIONS

Examination report issued by the European Patent Office dated Sep. 19, 2017 in the examination of the European Patent Application No. 16 180 393.7.
Examination report issued by the European Patent Office dated Dec. 13, 2016 in the examination of the European Patent Application No. 16 180 393.7.

* cited by examiner

*Primary Examiner* — Rena Dye Cronin
(74) *Attorney, Agent, or Firm* — Lee & Morse, P.C.

(57) ABSTRACT

A battery cell holder member, including a main body including a plurality of accommodating portions accommodating ends of a plurality of battery cells, respectively, and a partition separating the plurality of accommodating portions; at least one stopper portion on a first side of the partition; and at least one engaging portion on a second side of the partition.

10 Claims, 7 Drawing Sheets

BATTERY CELL HOLDER MEMBER

CROSS-REFERENCE TO RELATED APPLICATION

Korean Patent Application No. 10-2015-0102677, filed on Jul. 20, 2015, in the Korean Intellectual Property Office, and entitled: "Battery Cell Holder Member," is incorporated by reference herein in its entirety.

BACKGROUND

1. Field

Embodiments relate to a battery cell holder member.

2. Description of the Related Art

A secondary battery, unlike a primary battery, which may not be rechargeable, may be reused by recharging and discharging the secondary battery.

SUMMARY

Embodiments may be realized by providing a battery cell holder member, including a main body including a plurality of accommodating portions accommodating ends of a plurality of battery cells, respectively, and a partition separating the plurality of accommodating portions; at least one stopper portion on a first side of the partition; and at least one engaging portion on a second side of the partition.

The partition may include a first member separating accommodating portions arranged in a first direction among the plurality of the accommodating portions, and the at least one stopper portion may be across first and second accommodating portions adjacent to each other and separated by the first member.

The at least one stopper portion may be over an area defined by the first accommodating portion and an area defined by the second accommodating portion.

The at least one stopper portion may be on one side of a center line between centers of the first and second accommodating portions.

The at least one engaging portion may include an extending part extending perpendicularly away from a bottom surface of the first member, the bottom surface being opposite a top surface of the first member, and the extending part may extend to centers of the battery cells accommodated in the accommodating portions.

The partition may further include a second member separating accommodating portions arranged in a second direction among the plurality of accommodating portions, and the extending part may extend away from the bottom surface of the first member between the center line and the second member.

The at least one stopper portion and the at least one engaging portion may be arranged in a row along the first member. \

The main body may further include a fastening part protruding from a top surface of the main body, the top surface of the main body corresponding to the top surface of the first member, and a fastening groove formed in a side surface of the main body; and the fastening part and the fastening groove may have a complementary structure and closely fit together.

The at least one stopper portion, the at least one engaging portion, the fastening part and the fastening groove may be arranged in the row along the first member.

The fastening groove may also be formed in the top surface of the main body.

At least one accommodating portion among the plurality of the accommodating portions may include an opening along a side surface of the main body, the battery cell holder member may further include an auxiliary stopper portion on an upper part of the opening, and the upper part of the opening may correspond to a top surface of the second member.

A thickness of the auxiliary stopper portion may be smaller than a thickness of the at least one stopper portion.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
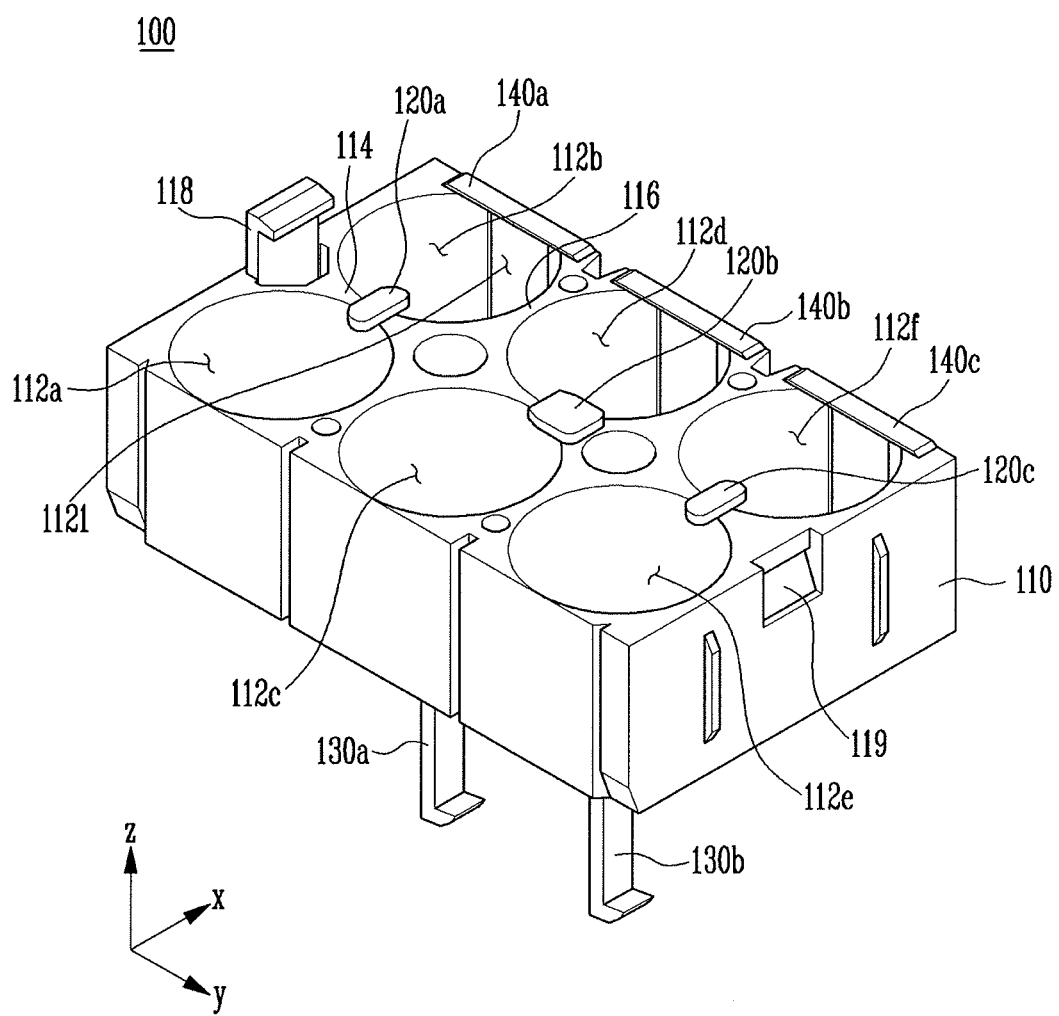
FIG. 1 illustrates a diagram of a perspective view of a battery cell holder member according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Like reference numerals refer to like elements throughout.

In an embodiment, a battery cell holder member may accommodate battery cells in various forms.

According to an embodiment, the battery cell holder member may easily accommodate round-shaped battery cells; therefore, further explanations will be focused on descriptions of a battery cell holder member for circular battery cells.

FIG. 1 illustrates a perspective view of a battery cell holder member 100 according to an embodiment.

Figure 2:
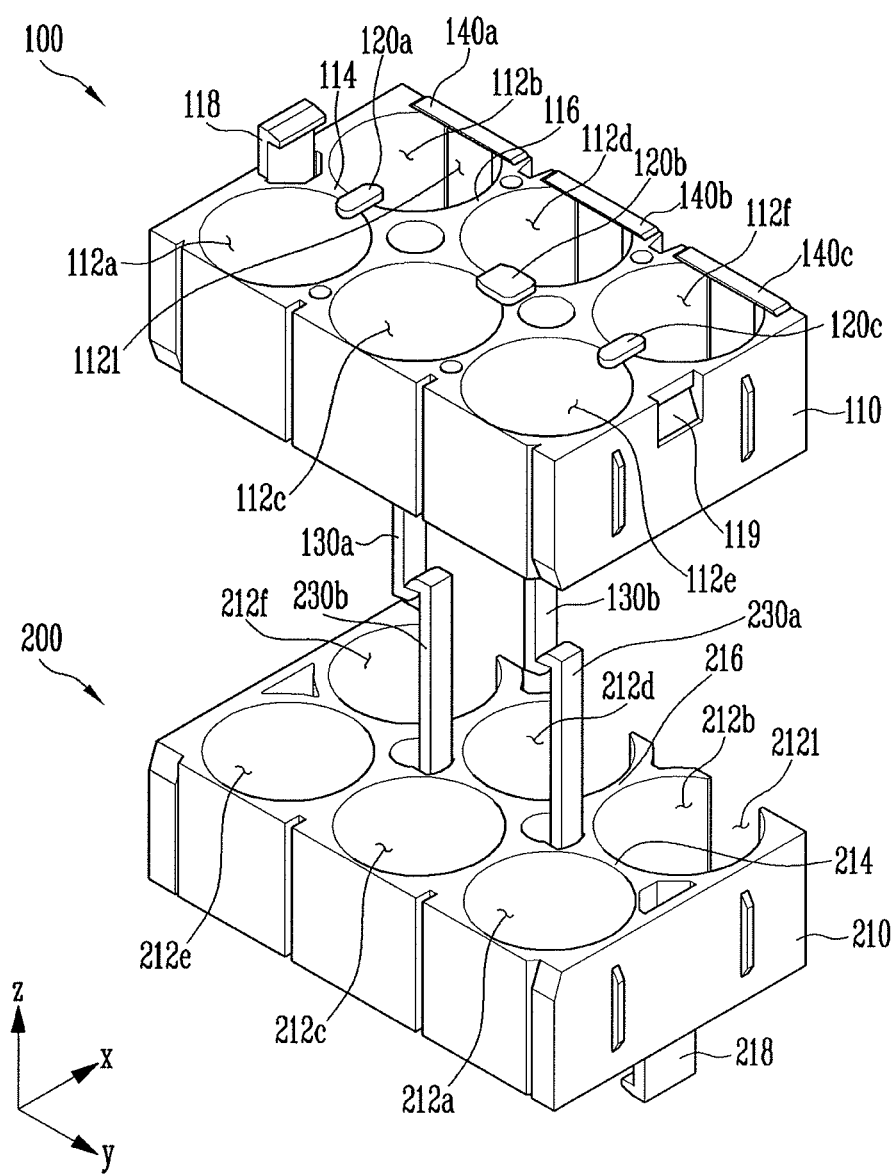
FIG. 2 illustrates a diagram of a battery cell holder by using a battery cell holder member according to an embodiment.

FIG. 2 illustrates a diagram of a structure of a battery cell holder 10 using a battery cell holder member 100 according to an embodiment.

Figure 3:
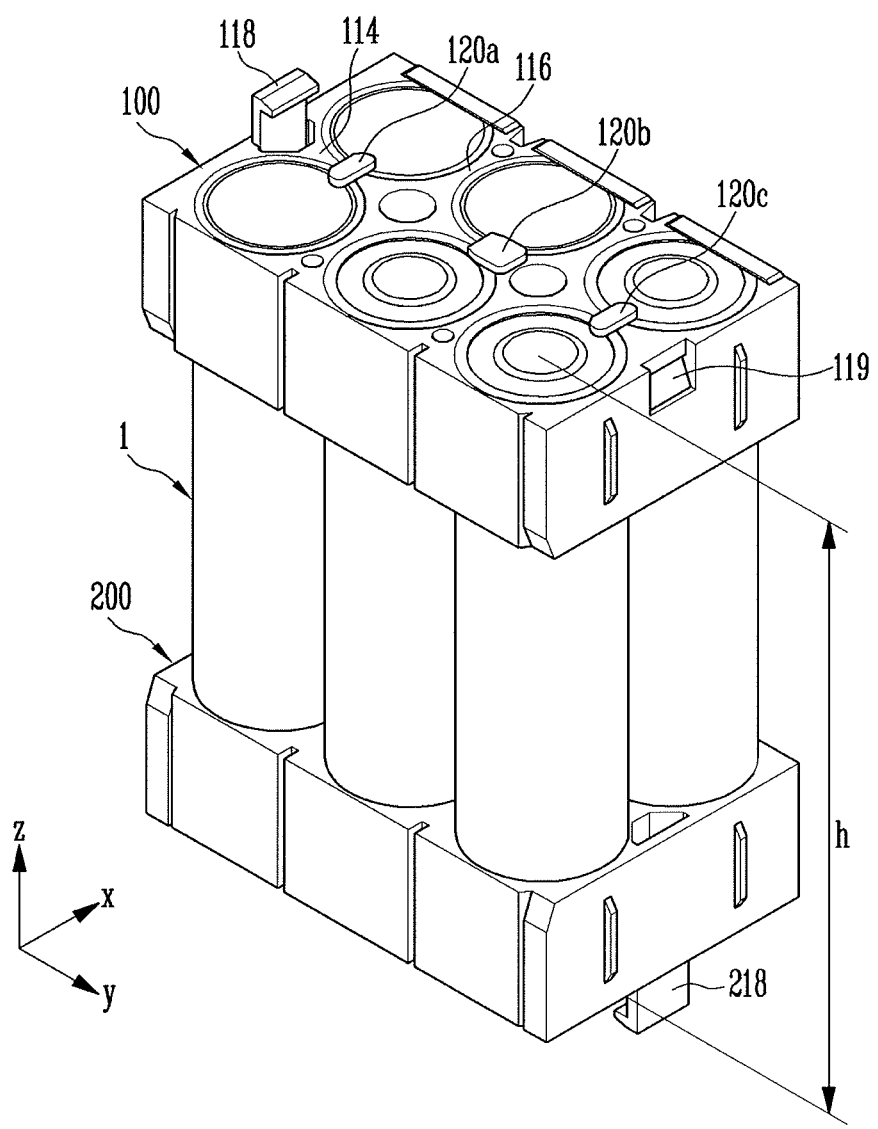
FIG. 3 illustrates a battery cell holder having a plurality of battery cells mounted thereon by using a battery cell holder member according to an embodiment.

FIG. 3 illustrates a diagram of a battery cell holder 10 having a plurality of battery cells 1 using a battery cell holder member 100 according to an embodiment.

The battery cell holder member 200 in each of FIGS. 2 and 3 is indicated with different reference numerals, i.e., 100 and 200, and a cell battery cell holder 10 may be formed using two different battery cell holder members 100 and 200.

In an embodiment, the battery cell holder member 100 of the upper portion and the battery cell holder member 200 of the lower portion may have a substantially same structure.

When the battery cell holder member 100 of the upper portion is rotated 180 degrees from the front facing view reversing an up-down direction and a left-right direction, the battery cell holder member 200 of the lower portion may be formed. In reverse, when the battery cell holder member 200 of the lower portion is rotated 180 degrees from the front facing view to reverse an up-down direction and a left-right direction, the battery cell holder member 100 of the upper portion may be formed.

To facilitate explanation, only the hundred's place of the reference numeral for a battery cell holder member 200 at a lower part is changed from 1 to 2, e.g., accommodating portion 112a and accommodating portion 212a. The same applies when explaining another battery cell holder member 300 hereinafter.

As illustrated in FIGS. 1 to 3, the battery cell holder member 100 (hereinafter, "cell holder member") may include a main body 110, at least one stopper portion 120 and at least one engaging portion 130.

For example, the main body 110 according to an embodiment may include a plurality of accommodating portions 112a, 112b, 112c, 112d, 112e, and 112f to accommodate one end of a plurality of battery cells 1, respectively.

The plurality of battery cells 1 may be arranged in two rows towards, e.g., along, a first direction X and in three rows towards, e.g., along, a second direction Y, and there may be in total of six battery cells 1. The plurality of accommodating portions 112a, 112b, 112c, 112d, 112e, and 112f accommodating the one end of the plurality of battery cells, respectively, may also be arranged in two rows towards, e.g., along, the first direction X and in three rows towards, e.g., along, the second direction Y.

According to embodiments, the plurality of battery cells 1 may refer to, for example, six battery cells and there may be, for example, six accommodating portions for the battery cells 112a, 112b, 112xc, 112d, 112e, and 112f.

The main body 110 may include the partition 114 and 116 separating the accommodating portions 112a, 112b, 112c, 112d, 112e, and 112f.

The partition 114 and 116 may be formed of a first member 114 and a second member 116 separating the accommodating portions arranged in the first direction X and the accommodating portions arranged in the second direction Y.

A first member 114 of the partition may be disposed across the main body 110 in the second direction Y and separate the first accommodating portion 112a from the second accommodating portion 112b, the third accommodating portion 112c from the fourth accommodating portion 112d, and the fifth accommodating portion 112e from the sixth accommodating portion 112f.

The second member 116 of the partition may across the main body 110 in the first direction X and may separate the first accommodating portion 112a from the third accommodating portion 112c, the second accommodating portion 112b from the fourth accommodating portion 112d, the third accommodating portion 112c from the fifth accommodating portion 112d, and the fourth accommodating portion 112d from the sixth accommodating portion 112f.

At least one stopper portion 120a, 120b, and 120c may be formed on one side, e.g., in a third direction Z, of the partition 114 and 116.

At least one engaging portion 130a and 130b may be formed on another side, e.g., in the third direction Z, of the partition 114 and 116.

Hereinafter, referring to FIGS. 1 to 3 and FIGS. 4 to 5, structures of the stopper 120a, 120b, and 120c and the engaging portion 130a and 130b may be explained in more detail.

Figure 4A:
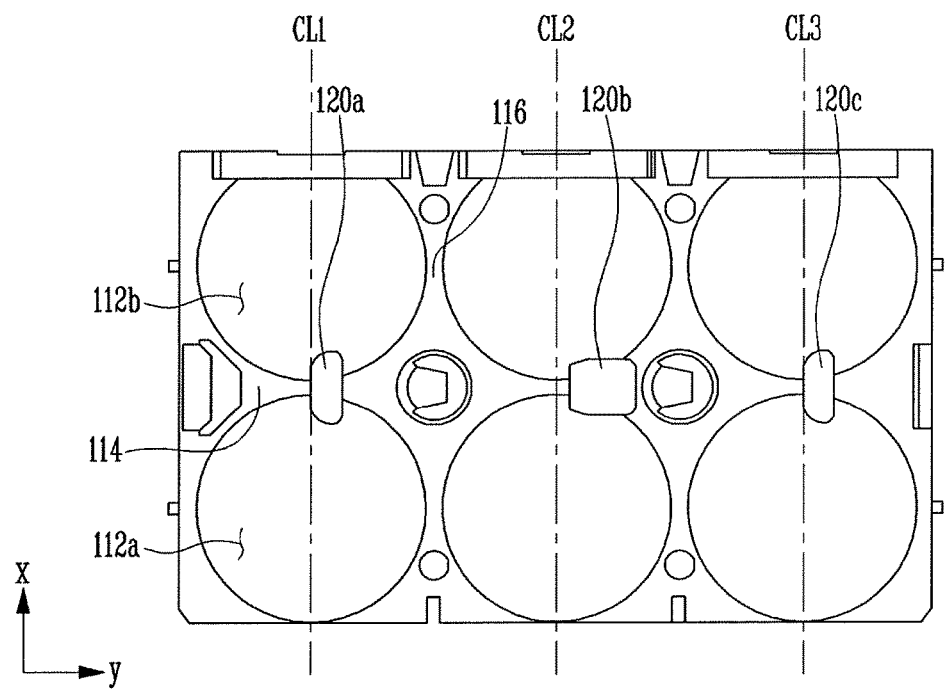
FIG. 4A illustrates a cross-sectional diagram of a battery cell holder member according to an embodiment.

FIG. 4A illustrates a sectional diagram of a battery cell holder member 100 according to an embodiment.

Figure 4B:
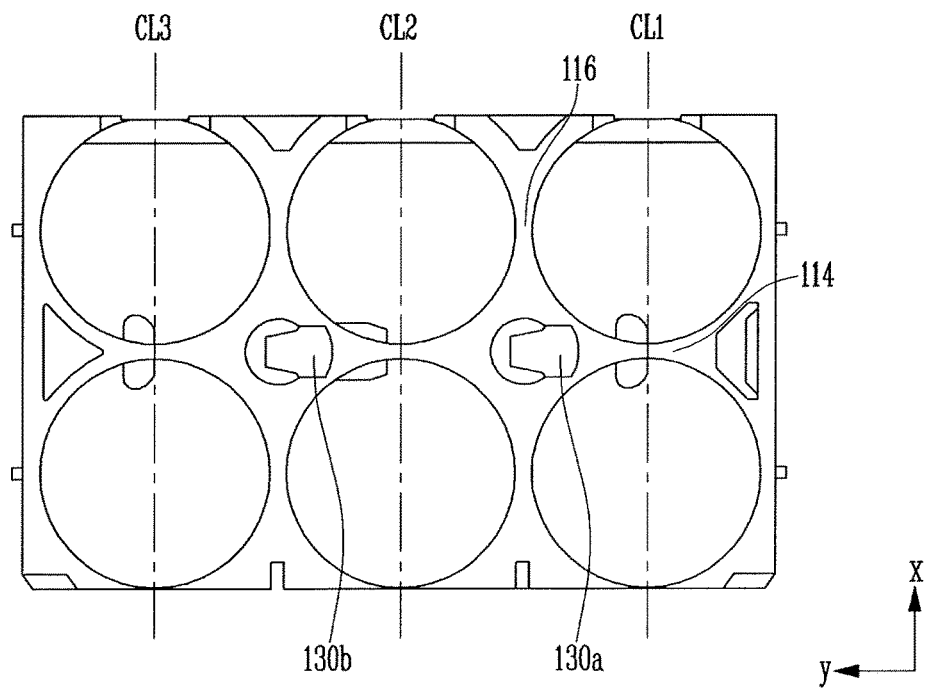
FIG. 4B illustrates a cross-sectional diagram of a half-turn battery cell holder member according to an embodiment having right and left and up and down reversed.

FIG. 4B illustrates a plan view of a cell holder member rotated 180 degrees reversing a left-right direction and an up-down direction from a front of the battery cell holder member 100. The diagram illustrates a plan view of a cell holder member rotated on a rotating axis 180 degrees in a first direction X.

Figure 5:
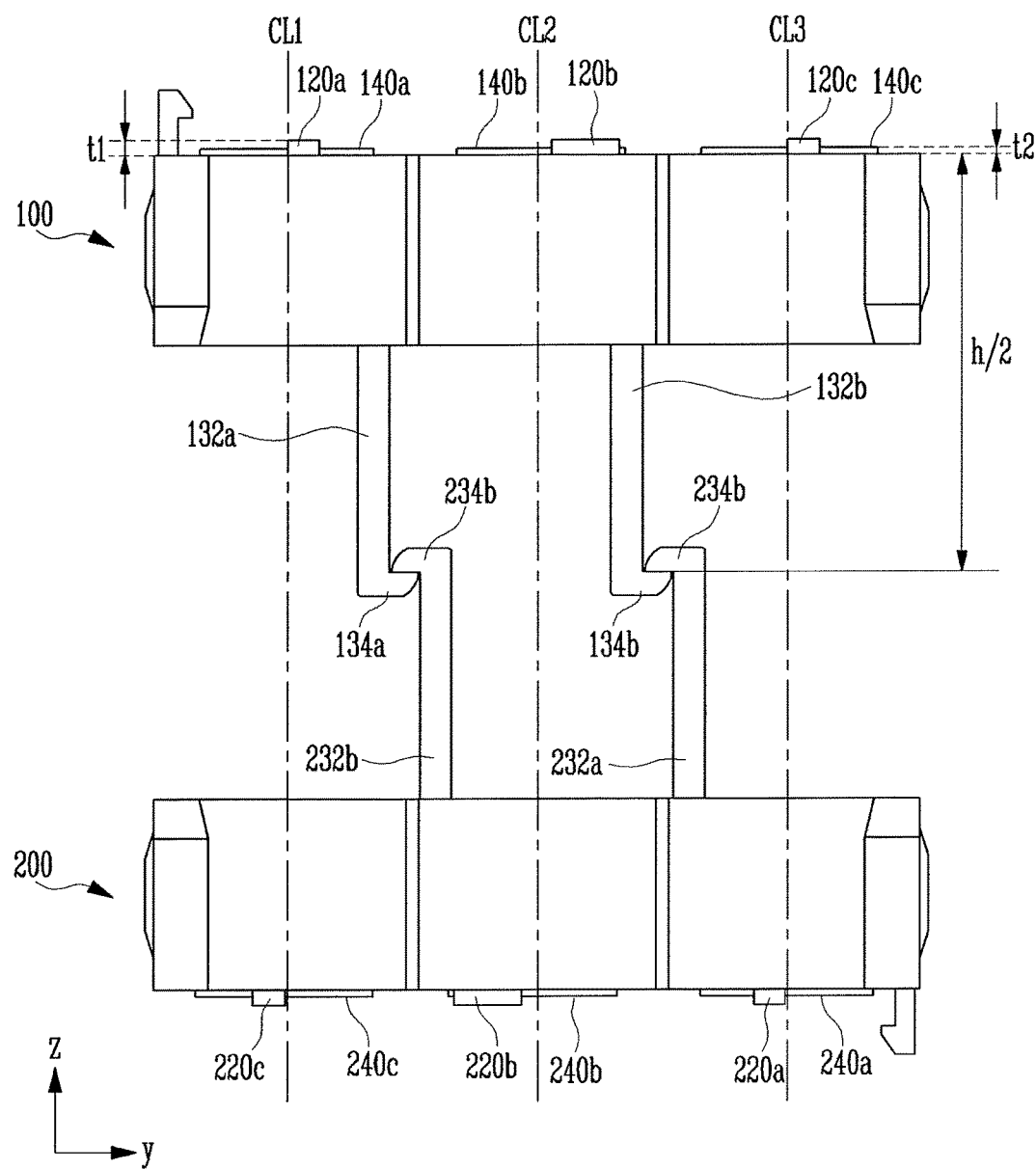
FIG. 5 illustrates a diagram of a front view of FIG. 2.

FIG. 5 illustrates a front view of a diagram illustrated in FIG. 2. FIG. 5 illustrates a front view of a battery cell holder 10 formed by using a battery cell holder member 100 according to an embodiment.

Referring to FIG. 4 and FIG. 5 along with FIG. 1 to FIG. 3 described above, the stopper portion 120a, 120b, and 120c having a predetermined thickness t1 may be formed on a top surface of the first member 114.

When the battery cell 1 is equipped inside the cell holder member 100, the stopper portion 120a, 120b, and 120c may, which may be a part contacting a top surface or a bottom surface of the battery cell 1, may stop the entry of the battery cell 1 into the cell holder member 100.

For example, when the battery cell 1 is inserted into the accommodating portion 112a of the cell holder member 100 to be integrated with the cell holder member 100, the battery cell 1 may be inserted (into the accommodating portion 112a) until the top surface of the battery cell (for example, a cap assembly) is stopped by the stopper portion 120a formed on a top surface of the first member 114.

Accordingly, the battery cell may be fixed by the stopper portion at a predetermined position inside the accommodating portion, and by fixing the battery cell in a Z direction using the engaging portion, which is explained hereinafter, and the cell holder member may hold the battery cell.

Then, the engaging unit 130a and 130b according to an embodiment may extend perpendicularly downward, e.g., away, from a lower surface of the first member 114.

Hereinafter, an engaging portion extending perpendicularly downward from a part, e.g., a first part, of the first member 114 is referred to as a first engaging portion 130a and an engaging portion extending perpendicularly downward from other parts, e.g., a second part, of the first member is referred to as a second engaging portion 130b.

For example, when one end of the battery cell 1 is equipped inside the cell holder member 100, first and second engaging portions 130a and 130b may form an engaging structure with first and second engaging portions of 230a and 230b of a cell holder member 200 holding other ends of the battery cell 1 to prevent the cell holder members 100 and 200 from deviating far from each other.

The cell holder member 200 holding the other ends of the battery cell 1 may have a substantially same structure as the cell holder member 100 holding the one end of the battery cell 1 and may correspond to the cell holding member 100 rotated 180 degrees (rotated 180 degrees on the axis extending in the first direction) as described above.

For example, the first engaging portion 130a of the cell holder member 100 at an upper part may form an engaging structure with the second engaging portion 230b of the cell holder member 200 at the lower part. The second engaging portion 130b of the cell holder member 100 at the upper part may form an engaging structure with the first engaging portion 230a of the cell holder member 200 at the lower part to integrate the cell holder members 100 and 200 together.

The battery cell 1 may be fixed by the engaging portions 130a and 130b at a predetermined position inside the accommodating portion. By fixing the battery cell 1 with the above-described stopper portion in the Z direction, the cell holder members 100 and 200 may finally hold the battery cell 1.

One end of the battery cell 1 may be disposed at the upper part of the cell holder member 100 and the other ends may be disposed at the lower part of the cell holder member 200 to prevent the deviation of the battery cell from the cell holder 10 by engaging the stopper portion 120a, 120b, and 120c in the Z direction to stably hold the battery cell 1 within the cell holder 10.

The engaging portion 130a and 130b according to an embodiment may include an extending portion 132a and 132b extending perpendicularly downward from the lower surface of the first member 114 and a protruding portion 134a and 134b protruding from one end of the extending portion 132a and 132b in an almost perpendicular direction to the extending portion 132a and 132b.

For example, the extending portion 132a and 132b may extend perpendicularly downward from the lower surface of the first member 114 in the Z direction, and the protruding portion 134a and 134b may protrude in a Y direction perpendicular to one end of the extending portion 132a and 132b.

A length of the protruding portion 134a and 134b protruding in the Y direction may be determined depending on an engaging structure with protruding portion 234a and 234b of the cell holder member 200 at the lower part rotated 180 degrees having an up-down direction and a right-left direction reversed. For example, the length of the protruding portion 134a and 134b may extend long enough to form the engaging structure with the protruding portion 234a and 234b and, at the same time, may also be short enough to arrange the cell holder member 100 at the upper part and cell holder member 200 at the lower part in a row after forming the engaging structure with the protruding portion 234a and 234b.

According to an embodiment, the extending portion 132a and 132b may extend to a center height (h/2) of the battery cell 1 accommodated in the accommodating portion.

As described above, the cell holder member 100 disposed at the upper part and a cell holder member 200 at the lower part may have a substantially same structure. The cell holder member 100 at the upper part when rotated 180 degrees may correspond to the cell holder member 200 disposed at the lower part, and it may be appropriate for the extending portion 132a and 132b to extend to the center height h/2 of the battery cell 1 to accommodate the battery cell 1 having the predetermined height h.

Based on the above-described structure, by simply positioning one cell holder member 100 at the upper part and the other cell holder member 200 at the lower part, the two cell holder member 100 and 200 may form the engaging structure based on each of the engaging portions and a stopping structure based on the above-described stopper portions to stably fix the battery cell 1 in the cell holder 10.

Hereinafter, a one-sided structure of an embodiment is described in detail.

As described above, the stopper portions 120a, 120b, and 120c according to an embodiment may have a predetermined thickness t1 and be formed on the top surface of the first member 114.

Each of the stopper portions 120a, 120b, 120c may be positioned crossing the first and second accommodating portions 112a and 112b, the third and fourth accommodating portions 112c and 112d and the fifth and sixth accommodating portions 112e and 112f positioned adjacent to each other, respectively, and separated by the first member 114.

The first stopper portion 120a refers to a stopper portion disposed across the first and second accommodating portions 112a and 112b stopping the battery cells from entering the first and second accommodating portions 112a and 112b, a second stopper portion 120b refers a stopper portion disposed across the third and fourth accommodating portions 112c and 112d stopping the battery cells from entering and entering the third and fourth accommodating portions 112c and 112d and a third stopper portion 120c refers to a stopper portion disposed across the fifth and a sixth accommodating portions 112e and 112f stopping the battery cells from entering the fifth and a sixth accommodating portions 112e and 112f. Hereinafter, the first stopper portion 120a may be described in detail.

As described above, the first stopper portion 120a may be disposed across the adjacent first and second accommodating portions 112a and 112b, which may be separated by the first member 114. The first stopper portion 120a may be positioned over areas defined by the first accommodating portion 112a and the second accommodating portions 112b.

The first stopper portion 120a may allow the battery cells inserted in the first and second accommodating portions to be stopped at a predetermined position.

One end of the first stopper portion 120a disposed at the area defined by the first accommodating portion 112a may contact a cap assembly of the battery cell inserted in the first accommodating portion, and the other ends, e.g., a second end, of the first stopper portion 120a disposed at the area defined by the second accommodating portion 112b may contact the cap assembly of the battery cell inserted in the second accommodating portion 112b.

For example, the first stopper 120a formed in a part of an upper surface of the first member 114 may have one end protruding towards the first accommodating portion 112a and may be in contact with the cap assembly of the battery cell inserted into the first accommodating portion 112a. The first stopper 120a may have other ends, e.g., a second end, protruding towards the second accommodating portion 112b and may be in contact with the cap assembly of the battery cell inserted into the second accommodating portion 112b. Such descriptions may also apply to other stopper portions 120b and 120c. The second stopper 120b formed in other portions of the top surface of the first member 114 may have one end protruding towards the third accommodating portion 112c and may be in contact with the cap assembly of the battery cell inserted in the third accommodating portion 112c. The second stopper may have other ends, e.g., a second end, protruding towards the fourth accommodating portion 112d and may be in contact with the cap assembly of the battery cell inserted in the fourth accommodating portion. The third stopper 120c may have one end protruding towards the fifth accommodating portion 112e and may be in contact with the cap assembly of the battery cell inserted in the fifth accommodating portion. The third stopper 120c may have other ends, e.g., a second end, protruding towards the sixth accommodating portion 112f and may be in contact with the cap assembly of the battery cell inserted in the sixth accommodating portion.

The first stopper portion 120a according to an embodiment may be disposed on one side with respect to, e.g., of, a center line CL1 connecting, e.g., between, centers of the first and second accommodating portions 112a and 112b as shown in FIG. 4.

According to an embodiment, the first stopper portion 120a may have a one-sided structure having a center of the first stopper portion 120a disposed on one side of the center line CL1 connecting the centers of the first and second accommodating portions 112a and 112b, not on the center line CL1.

As for the second stopper portion 120b, the second stopper portion may have a one-sided structure having a center disposed on one side of a center line CL2 connecting centers of the third and fourth accommodating portions 112c and 112d, not on the center line CL2. The third stopper portion 120c may also have a one-sided structure having a center of the third stopper portion disposed on one side of a center line CL3 connecting centers of the fifth and sixth accommodating portions 112e and 112f, not on the center line CL3.

Considering that one cell holder member may be integrated with a substantially same cell holder member only rotated 180 degrees having an up-down direction and a right-left direction reversed, it may be appropriate for the first and third stopper portions 120a and 120c to be disposed on a substantially same side.

For example, as shown in FIG. 5, the stopper portions 120a, 120b, and 120c of the cell holder member 100 disposed at the upper part may be disposed on a substantially same side (for example, on a right side based on a center C1, C2, and C3) which may allow the stopper portions 220a, 220b and 220c of the cell holder member 200 at the lower part, rotated 180-degrees having an up-down direction and a right-left direction reversed to be disposed on a substantially same side (for example, on a left side based on the center C1, C2, and C3).

The center C1, C2, and C3 may be a line connecting the center of the accommodating portion of the cell holder at the upper part with the corresponding center of the accommodating portion of the cell holder at the lower part and be formed in a substantially same plane surface as the center line CL1, CL2, and CL3 as illustrated in FIG. 4.

Figure 6:
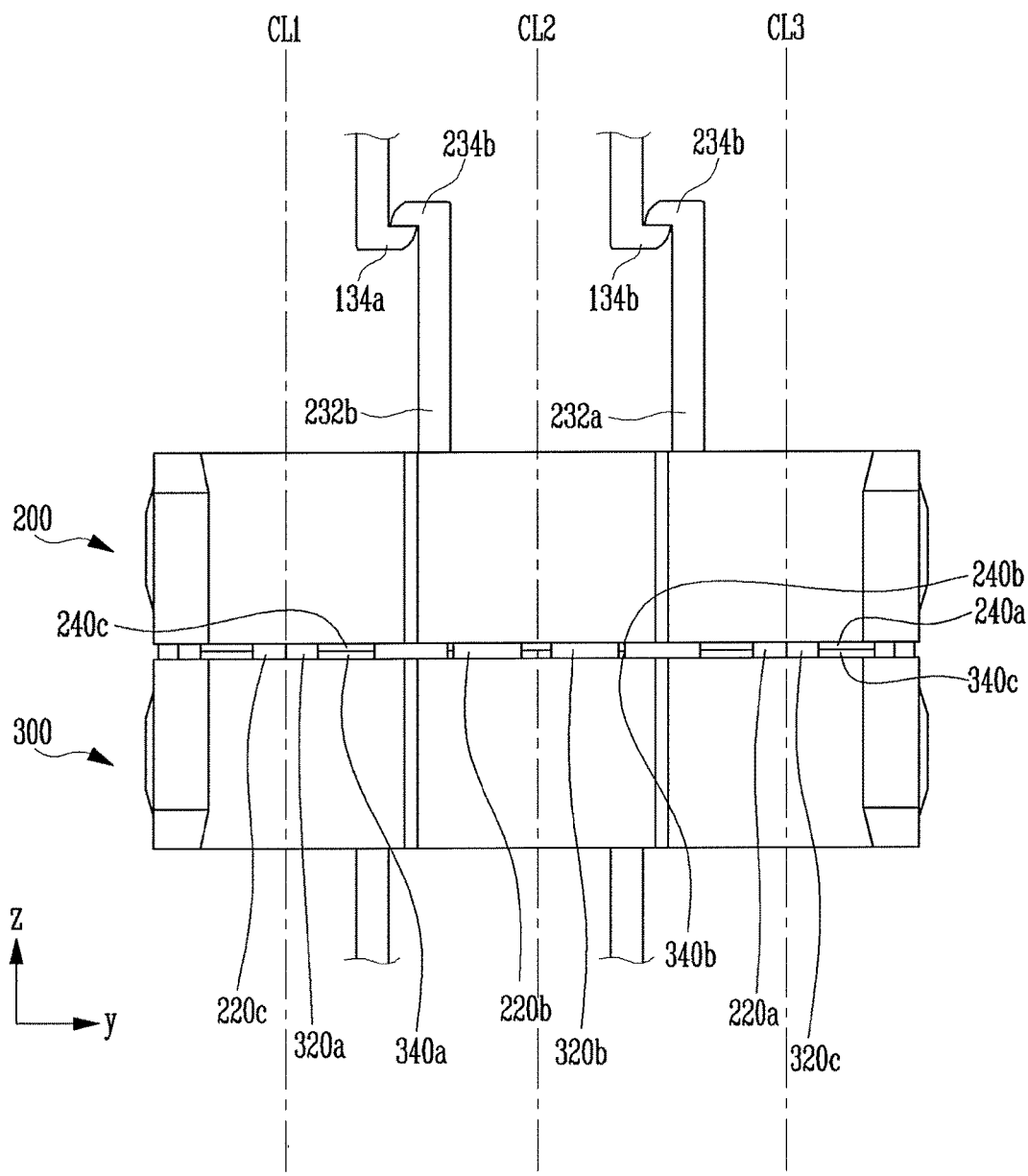
FIG. 6 illustrates a diagram of a process of structuring a battery module using a battery cell holder member according to an embodiment.

As illustrated in FIG. 6, due to, for example, the one-sided structure, stopper portions 320a, 320b, 320c of the cell holder member 300 re-connected with the stopper portions 220a, 220b, 220c of the lower cell holder member 200 to form a battery module, may be arranged after being offset. A compact battery module having a shorter distance between the cell holders may be formed by offsetting a height of the stopper portions of the cell holder member 300, which may be additionally connected to form a battery module.

The cell holder member 300, which may be additionally connected, may correspond to the lower cell holder member 200 rotated 180 degrees having an up-down direction and a right-left direction reversed. The upper cell holder member 100, the lower cell holder member 200, and the additionally connected cell holder member 300 may all have a substantially same structure as described above.

In an embodiment, the second stopper portion 120b may be one-sided towards a substantially same side as the first and third stopper portions 120a and 120c. In an embodiment, the second stopper portion 120b may be one-sided towards a side different from that of the first and third stopper portions 120a and 120c.

Regarding the one-sided structure of the stopper portions 120a, 120b, and 120c, the engaging portion 130a and 130b may also have a one-sided structure according to an embodiment. Hereinafter, the first engaging portion 130a is described.

As described above, the first engaging portion 130a may include an extending portion 132a extending perpendicularly downward from the lower surface of the first member 114 and a protruding portion 134a protruding generally in perpendicular, e.g., perpendicularly, to one end of the extending portion 132a.

As described with reference to FIG. 5, the extending portion 132a may extend perpendicularly downward from a part of the lower surface of the first member 114 and may have the one-sided structure extending perpendicularly downward from an area between the center line CL1 and the second member 116. For example, the extending portion 132a may have the one-sided structure and may not be disposed at the center between the center line CL1 and the center line CL2.

The extending portion 132b of the second engaging portion 130b having a one-sided structure may extend perpendicularly downward from other portions of the lower surface of the first member 114 and be disposed on one side, not at a center between the center line CL2 and the center line CL3.

As described above, considering the integrated structure between the cell holder members rotated 180 degrees having a right-left direction and an up-down direction reversed, it may be appropriate for the extending portion 132a of the first engaging portion and the extending portion 132b of the second engaging portion to be disposed on a substantially same side.

As described above, the extending portion 132a having the one-sided structure and the protruding portion 134a protruding from one end of the extending portion 132a in a direction generally in perpendicular, e.g., perpendicularly, to the extending portion 132a may form an engaging structure with the engaging portions disposed between the two substantially the same cell holder members 100 and 200 by simply having the cell holder members 100 and 200 at the upper part and at the lower part, respectively.

For example, without using a separate screw member to integrate the two cell holder members, the first engaging portion 130a of the cell holder member 100 at the upper part may form the engaging structure with the second engaging portion 230b of the cell holder member 200 at the lower part. The two cell holder members 100 and 200 may be integrated by forming the engaging structure between the second engaging portion 130b of the cell holder member 100 at the upper part and the first engaging portion 230a of the cell holder member 200 at the lower part.

According to an embodiment, the stopper portion 120a, 120b, and 120c and the engaging portion 130a and 130b having the one-sided structure deviating from the center of the accommodating portion may be formed on a top surface and a bottom surface of the first member, respectively, and be arranged in a row along the first member 114.

Referring back to FIG. 1 to FIG. 3, the main body 110 according to an embodiment may further include a fastening portion 118 protruding outward from a top surface of the main body, which may correspond to the top surface of the first member, and a fastening groove 119 formed inward from a top surface of the main body and a side surface of the main body opposite the fastening portion 118.

The fastening portion 118 and the fastening groove 119 may have a complementary structure that closely fits the fastening portion 118 and the fastening groove 119.

As shown in FIG. 6, the cell holder member 300 may be reconnected from a bottom of the cell holder member 200 at the lower part to form a battery module, considering the integrated structure between the cell holder members 1, and it may be appropriate to arrange the fastening portion 118 with the fastening groove 119 in a row along the first member 114. Consequently, the stopper portion 120a, 120b, and 120c, the engaging portion 130a and 130b, the fastening portion 118, and the fastening groove 119 may all be arranged in a row along the first member 114.

Referring back to FIG. 1 and FIG. 2, the main body 110 according to an embodiment may include a plurality of accommodating portions 112a, 112b, 112c, 112d, 112e, and 112f among which the second, fourth and sixth accommodating portions 112b, 112d and 112f may have an opening portion 1121 opening a contact area between each of the main bodies 110 and side surfaces.

A battery management system BMS controlling an operation of the battery cell may be installed on a side surface of the main body 110. By forming the openings 1121 on a partial accommodating portions 112b, 112d and 112f including a part contacting with the side surface of the main body, the cell holder member 100 having a smaller width in a first direction X may be designed.

Based on the integrating structure integrating between the cell holder member 100 and the cell holder member 200 rotated 180 degrees having a left-right direction and an up-down direction reversed, as illustrated in FIG. 2, the opening portion 2121 may be formed on a part of the accommodating portions 212b, 212d and 212f including a part, e.g., an opening, contacting, e.g., running along, the side surface of the main body.

According to an embodiment, an upper portion of the opening 1121, e.g., which may correspond to a top surface of the second member, may further include an auxiliary stopper portion 140a, 140b and 140c assisting functions of the stopper portion 120a, 120b, and 120c.

The auxiliary stopper portion 140a, 140b and 140c having a predetermined thickness t2 may be formed on a top surface of the second member 116.

The predetermined thickness t2 of the auxiliary stopper portion may be smaller than the thickness t1 of the stopper portion. For example, the predetermined thickness t2 of the auxiliary stopper portion may be half of the thickness t1 of the stopper portion.

As described above, the stopper portion 120a, 120b, and 120c may have the one-sided structure, when coupled with the additional cell holder member 300 to form the battery module, the stopper portion 120a, 120b, and 120c may have a structure offsetting the stopper portion 320a, 320b, and 320c of the cell holder member 300. Accordingly, when forming the battery module, an increased height by the added stopper portion 320a, 320b, and 320c of the cell holder member 300 may be offset.

However, due to, for example, characteristics of the auxiliary stopper portion 140a, 140b and 140c formed in an upper part of the opening portion 1121 adjacent to the side surface of the main body 110, the auxiliary stopper portion 140a, 140b and 140c may not have the one-sided structure or an offset structure. Therefore, by setting the thickness t2 as half of the thickness t1 of the stopper portion 120a, 120b, and 120c, the battery module may be formed without having an increased height added thereto.

Figure 7:
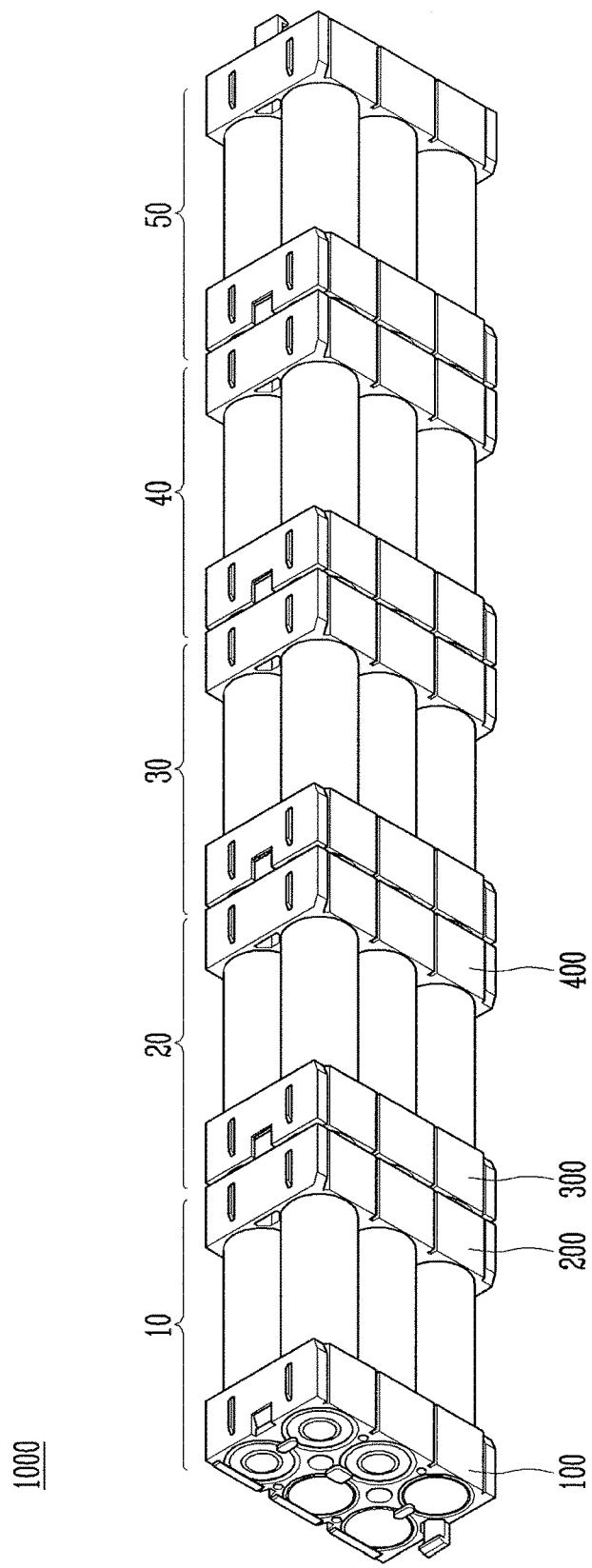
FIG. 7 illustrates a diagram of a battery module using a battery cell holder member according to an embodiment.

FIG. 7 illustrates a diagram of a forming of a battery module 1000 using a battery cell holder member 100 according to an embodiment.

As illustrated in FIG. 7, a cell holder 10 may be formed by using two cell holder members 100 and 200 and by coupling other cell holders 20, 30, 40 and 50 in series which are formed in a substantially same manner.

As described above, to form one cell holder 10, the cell holder member 100 may be integrated with a cell holder member 200 rotated 180 degrees. In a substantially same manner, a cell holder 20 may be formed by having a cell holder member 300 and another cell holder member rotated 180 degrees engaged therein. Due to, for example, the structure between the cell holder member 200 of the cell holder 10 and the cell holder member 300 of the cell holder 20, one cell holder 10 may be coupled to another cell holder 20 in series.

Based on the one-sided structure of the stopper portion 120a, 120b, and 120c according to an embodiment, an increased height of the stopper portion of the cell holder member 300 additionally added to form the battery module 1000 may be offset and forming a compact battery module reducing a distance between cell holders may be possible.

In an embodiment, the engaging portion 130a and 130b based on the one-sided structure may form the engaging structure without using an additional screw member to integrate the two cell holder members by simply placing one cell holder at the upper part and another cell holder at the lower part and using the engaging portions of the two cell holder members.

By way of summation and review, a secondary battery may be used as an energy source for, for example, mobile devices, electric vehicles, hybrid vehicles, electric bikes, or an uninterruptible power supply. Depending on the external devices to which the secondary battery may be applied, the secondary battery may be in a single battery form or in a battery module form by connecting multiple battery cells.

Mobile devices such as cellular phones, may be operated for a predetermined period of time by using an output and capacitance of a single battery, however, demand for a battery module having a greater output and capacitance may increase to satisfy the required output and capacitance of electric vehicles and hybrid vehicles, which may consume a greater amount of energy and may be operated for a longer period of time.

The number of battery cells that may be connected in series or in parallel may vary depending on the output and the capacitance that may be required of the battery module, and a battery cell holder may be used to connect the battery cells. A comparative battery cell holder may increase the volume of the battery module and the manufacturing costs due to, for example, the complexity of the formation.

Embodiments relate to a battery cell holder member that may be capable of forming a compact battery cell holder and a battery module by using one cell holder member, e.g., a battery cell holder member of an upper portion and a battery cell holder member of a lower portion may have a substantially same structure. According to embodiments, a compact battery cell holder and a battery module may be formed by using a single cell holder member, e.g., a battery cell holder member of an upper portion and a battery cell holder member of a lower portion may have a substantially same structure. Further, according to embodiments, by using such a single battery cell holder member, the manufacturing process may be simplified, and the manufacturing costs may also be reduced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery cell holder member, comprising:
a main body including a plurality of accommodating portions accommodating ends of a plurality of battery cells, respectively, and a partition separating the plurality of accommodating portions, the partition including a first member separating accommodating portions arranged in a first direction among the plurality of the accommodating portions, wherein the main body further includes a fastening part protruding from a top surface of the main body, the top surface of the main body corresponding to the top surface of the first member, and a fastening groove formed in a side surface of the main body, wherein the fastening part and the fastening groove have a complementary structure and closely fit together;
at least one stopper portion on a first side of the partition; and
at least one engaging portion on a second side of the partition.

2. The battery cell holder as claimed in claim 1, wherein:
the at least one stopper portion is across first and second accommodating portions adjacent to each other and separated by the first member.

3. The battery cell holder member as claimed in claim 2, wherein the at least one stopper portion is over an area defined by the first accommodating portion and an area defined by the second accommodating portion.

4. The battery cell holder member as claimed in claim 2, wherein the at least one stopper portion is on one side of a center line between centers of the first and second accommodating portions.

5. The battery cell holder member as claimed in claim 4, wherein:

the at least one engaging portion includes an extending part extending perpendicularly away from a bottom surface of the first member, the bottom surface being opposite a top surface of the first member, and
the extending part extends to centers of the battery cells accommodated in the accommodating portions.

6. The battery cell holder member as claimed in claim 5, wherein:
the partition further includes a second member separating accommodating portions arranged in a second direction among the plurality of accommodating portions, and
the extending part extends away from the bottom surface of the first member between the center line and the second member.

7. The battery cell holder member as claimed in claim 6, wherein the at least one stopper portion and the at least one engaging portion are arranged in a row along the first member.

8. The battery cell holder member as claimed in claim 1, wherein the fastening groove is also formed in the top surface of the main body.

9. A battery cell holder member, comprising:
a main body including a plurality of accommodating portions accommodating ends of a plurality of battery cells, respectively, and a partition separating the plurality of accommodating portions, the partition further including a member separating accommodating portions arranged in a direction among the plurality of accommodating portions,
at least one stopper portion on a first side of the partition; and
at least one engaging portion on a second side of the partition, wherein:
at least one accommodating portion among the plurality of the accommodating portions includes an opening along a side surface of the main body, the battery cell holder member further including an auxiliary stopper portion on an upper part of the opening, the upper part of the opening corresponding to a top surface of the member.

10. The battery cell holder member as claimed in claim 9, wherein a thickness of the auxiliary stopper portion is smaller than a thickness of the at least one stopper portion.

* * * * *